United States Patent [19]
Bost et al.

[11] Patent Number: 5,871,613
[45] Date of Patent: Feb. 16, 1999

[54] METHOD AND APPARATUS FOR AUTOMATICALLY GLUE-BONDING SCRIM TO A FIBER MAT

[76] Inventors: Marshall Eugene Bost, 4770 Oakview Dr., Trinity, N.C. 27370-8400; Mark Lee Thompson, P.O. Box 7871, High Point, N.C. 27264-7891

[21] Appl. No.: 724,135

[22] Filed: Sep. 30, 1996

[51] Int. Cl.⁶ .............................. B32B 31/08; B32B 31/12
[52] U.S. Cl. ..................... 156/62.2; 156/324; 264/112; 53/118
[58] Field of Search ................... 156/62.2, 62.8, 156/324; 264/113; 19/149, 296, 161.1, 308; 53/118

[56] References Cited

U.S. PATENT DOCUMENTS

| | | |
|---|---|---|
| 1,336,403 | 4/1920 | Weiss ................................ 156/62.2 X |
| 1,928,568 | 9/1933 | Loomis . |
| 3,258,513 | 6/1966 | Berry et al. ....................... 156/62.2 X |
| 3,515,609 | 6/1970 | Rudloff . |
| 3,808,771 | 5/1974 | Drella et al. . |
| 3,964,232 | 6/1976 | Bender et al. . |
| 5,240,527 | 8/1993 | Lostak et al. ..................... 156/62.2 X |
| 5,261,622 | 11/1993 | Bolich . |

FOREIGN PATENT DOCUMENTS 4921515 of 1974 Japan .

*Primary Examiner*—Michael W. Ball
*Assistant Examiner*—Sam Chuan Yao
*Attorney, Agent, or Firm*—Rhodes, Coats & Bennett, LLP

[57] ABSTRACT

The present invention entails a method and apparatus for automatically glue-bonding scrim to a non-woven fiber mat. The fiber mat and scrim are both conveyed or advanced towards a pair of compression rollers. Prior to reaching the compression rollers, a series of glue guns direct a spray of glue onto one side of either the fiber mat or the scrim. Thereafter, the fiber mat and scrim are fed through the pair of compression rollers that press the scrim and fiber mat together to form a bonded fiber mat-scrim composite. From the compression rollers, the final formed fiber mat-scrim composite is conveyed to a take-up station where the composite is overlapped or wound into a roll.

41 Claims, 8 Drawing Sheets

METHOD AND APPARATUS FOR AUTOMATICALLY GLUE-BONDING SCRIM TO A FIBER MAT

FIELD OF THE INVENTION

The present invention relates to fiber mat products and more particularly to a machine and a process for automatically applying a scrim sheet to either one side or both sides of a bonded non-woven fiber mat.

BACKGROUND OF THE INVENTION

Fiber mat material is widely used as a cushioning or padding material in a variety of products such as upholstered furniture, and bedding and quilting products. Typically, such fiber mat material comprises unbonded non-woven synthetic fibers and assumes a generally high loft, low to medium density character.

Typically, fiber mats are placed directly into products without any covering or sheathing. In certain situations, the individual fibers from the fiber mat tend to migrate and penetrate the covering of the product itself. This is, of course, undesirable. To counter this problem, it is known to apply a scrim type material to one side of an unbonded non-woven fiber mat. In particular, it is known to stitch the scrim to the fiber mat by simply penetrating the scrim and the fiber mat with a series of needles. In such a needle stitching process, the needles repeatedly pierce the scrim and move down into the fiber mat, after which the needles are retracted. In this process, fiber is pulled from the mat through various needle openings in the scrim and this tends to couple the scrim to the fiber mat. In addition, it is known to stitch scrim to a fiber mat by a conventional stitching technique. This is typically carried out on a Fales stitching machine.

However, these needle stitching processes are not totally satisfactory. First, with either stitching process, the fiber mat is compressed and accordingly the mat looses some of its loft. That is obviously undesirable. Secondly, the scrim is only attached at certain points. This obviously results in the scrim assuming a wrinkled surface about one side of the fiber mat. More importantly, the scrim that is simply needle stitched to the fiber mat and is not firmly attached and is prone to becoming separated from the fiber mat.

SUMMARY AND OBJECTS OF THE INVENTION

The present invention entails a method and machine for automatically glue-bonding a scrim material to a fiber mat. In particular, a non-woven fiber mat is conveyed towards an area where the fiber mat is merged with a sheet of scrim material. Prior to merging the scrim material with the fiber mat, glue is sprayed or otherwise applied to one side of either the fiber mat or the scrim. After the glue has been applied, the scrim and fiber mat are merged together and a pressing action is applied to glue-bond the scrim to the fiber mat, forming a fiber mat-scrim composite material.

In one embodiment of the present invention, the fiber mat is of a low to medium density fiber mat material that has a weight of approximately ¾ ounce to 8 ounces per square foot. This fiber mat material is conveyed or advanced towards a pair of compression rollers. Upstream from the compression rollers is a glue application station. Glue from a series of glue nozzles is sprayed onto one side of either the scrim or the fiber mat. Thereafter, both the scrim and the fiber mat are fed into the throat of a pair of compression rollers which compress the scrim against a surface of the fiber mat causing the scrim to be glue-bonded to the fiber mat.

In one embodiment of the present invention, the fiber mat-scrim composite is conveyed from the compression rollers to a winding station where the composite is wound to form a roll. Periodically, the composite is cut and the composite roll is removed from the machine and appropriately packaged.

The present invention also presents a method and machine for glue-bonding a sheet of scrim to both or opposite sides of a fiber mat. In this case, the fiber mat is initially advanced towards a first pair of compression rollers that act to press or bond a first sheet of scrim to one side of the fiber mat. After the first sheet of scrim has been glue-bonded to one side of the fiber mat, the fiber mat with the scrim bonded to one side is turned and directed in a direction generally opposite to its initial direction. Here, the fiber mat with the one sheet of scrim bonded thereto is directed through the underlying frame structure of the machine back past an initial starting point or feeding area. Here, the fiber mat with the scrim glue-bonded to the underside thereof is directed past a second glue station and through a second pair of compression rollers. Prior to reaching the second compression rollers, glue is applied to the exposed side of the fiber mat or to a second sheet of scrim and thereafter the second sheet of scrim and the fiber mat are directed through the second pair of compression rollers that effectively bonds the second sheet of scrim to the fiber mat. This produces a low to medium density fiber mat that includes scrim glue-bonded to opposite sides thereof.

It is therefore an object of the present invention to provide a method for automatically glue-bonding scrim to a fiber mat that produces a smooth scrim surface with a minimum of wrinkles.

Another object of the present invention is to provide a method of automatically glue-bonding scrim to a fiber mat that substantially eliminates tension in the fiber mat during the process of advancing the fiber mat.

Still a further object of the present invention is to reduce drafting within the fiber mat as it is advanced through the process by again minimizing tension in the fiber mat as it is advanced.

It is also an object of the present invention to provide an automatic glue-bonding process for combining a scrim sheet with a fiber mat that utilizes a positive feed to minimize tension in the components being laminated or glue-bonded together.

Still a further object of the present invention resides in the provision of the process referred to above that reduces or eliminates glue buildup on components of the conveying system.

It is also an object of the present invention to provide a process for automatically glue-bonding scrim to a fiber mat wherein the process produces a roll formed fiber mat-scrim composite wherein the outermost surface of the rolled fiber mat includes a scrim sheet bonded thereto.

Other objects and advantages of the present invention will become apparent and obvious from a study of the following description and the accompanying drawings, which are merely illustrative of such invention.

DETAILED DESCRIPTION OF THE INVENTION

Figure 1:
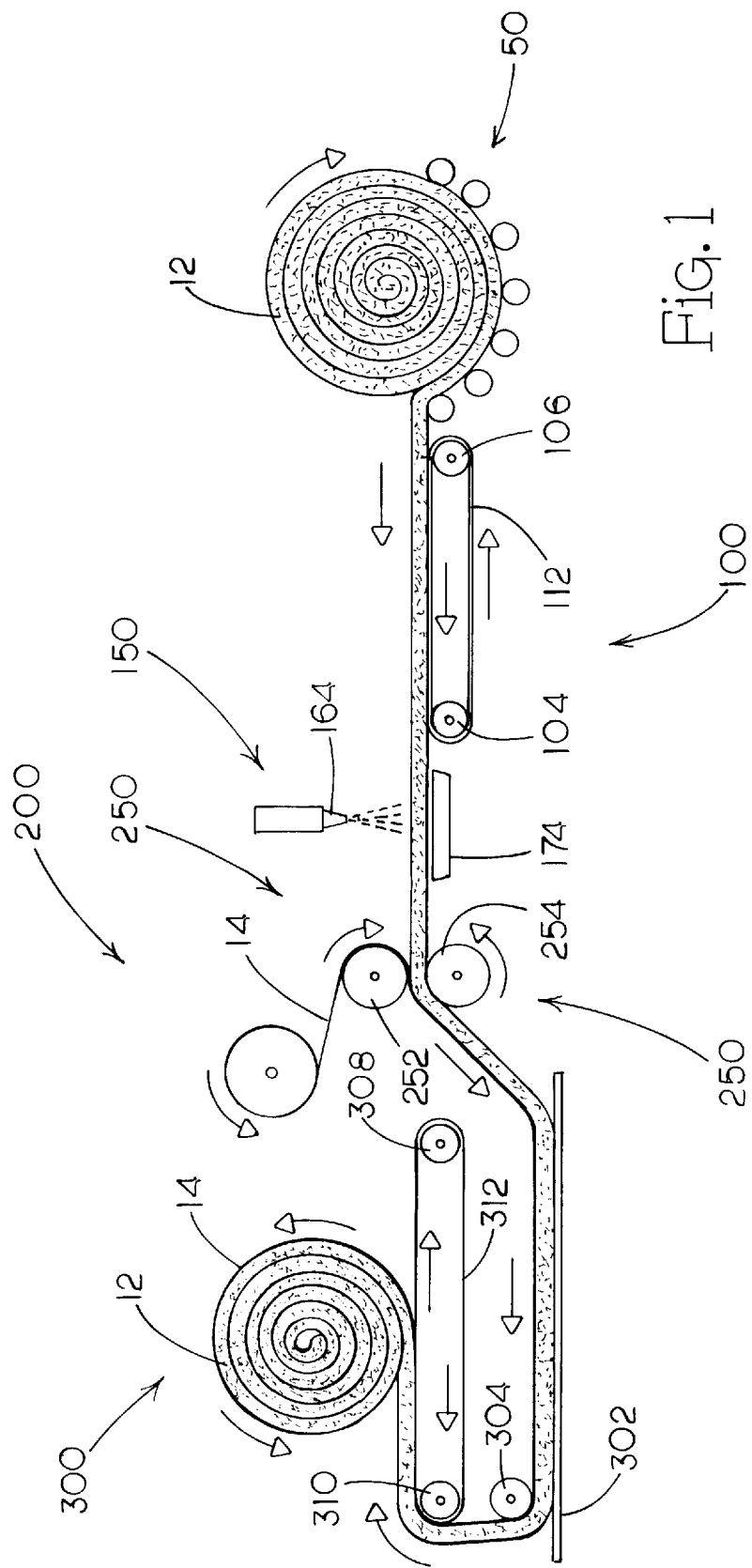
FIG. 1 is a schematic illustrating a method of automatically glue-bonding a layer of scrim to a fiber mat.

The present invention entails an automatic process or method for glue-bonding scrim 14 to a bonded non-woven fiber mat 12. The fiber mat 12 includes opposite sides referred to as upper and lower sides. In one embodiment, a process is disclosed for glue-bonding a sheet of scrim 14 to one side of the fiber mat 12 (FIG. 1). In another embodiment disclosed herein (FIG. 2), a process is disclosed wherein one sheet of scrim 14 is bonded to one side of the fiber mat 12 and a second sheet of scrim 14' is glue-bonded to the opposite side of the fiber mat 12.

With respect to FIG. 1, there is shown therein a schematic illustration that shows the process for glue-bonding a single sheet of scrim 14 to one side of the fiber mat 12. As shown in FIG. 1, the fiber mat 12 initially assumes the form of a roll. However, the fiber mat 12 can assume other forms. The roll formed fiber mat 12 is placed within a cradle structure, located at an unwinding station 50, that includes a series of driven rollers 54. Rollers 54 turn the fiber mat roll 12 clockwise as viewed in FIG. 1. An outer segment of the fiber mat 12 is directed onto an apron conveyor that includes a pair of spaced apart rollers 106 and 104 and at least one drive belt 112 trained therearound. This apron conveyor advances the fiber mat 12 to a glue station indicated generally by the numeral 150. At the glue station 150, glue is sprayed and applied to the upper surface of the fiber mat 12. A glue catch pan 174 is disposed under a series of glue nozzles 164 to catch excess spray.

From the glue application station 150, the fiber mat 12 is advanced towards a pair of compression rollers 252 and 254. Disposed adjacent the compression rollers 252 and 254 is a source of scrim 14. In particular, the scrim 14 is disposed in a roll form and is pulled therefrom and advanced into the inlet side of the rollers 252 and 254. Both the fiber mat 12 and the scrim 14 are fed into the throat of the compression rollers 252 and 254. Since glue has been applied to the upper surface of the fiber mat 12, it is appreciated that the compression rollers 252 and 254 compress the scrim 14 onto the fiber mat 12 and form a glue bonded composite comprised of the fiber mat 12 and the scrim 14.

From the compression rollers 252 and 254, the fiber mat-scrim composite is advanced to a winding station, indicated generally by the numeral 300. The fiber mat-scrim composite is directed from the compression rollers 252 and 254 onto a stationary platform 302. As the composite fiber mat and scrim move across the stationary platform 302, the composite is turned around an idler 304. From the idler 304, the fiber mat-scrim composite is advanced upwardly onto a conveyor assembly that includes a pair of spaced apart rollers 308 and 310 having one or more conveyor belts 312 trained therearound. This conveyor assembly causes the fiber mat-scrim composite to be wound counter clockwise around a shaft into a final packaged product. Once a preselected quantity of the fiber mat-scrim composite has been accumulated, the composite is cut (by manual or automatic means) and the roll formed composite is packaged. Thereafter, the process continues to form succeeding roll formed composites of the fiber mat and scrim.

Figure 2:
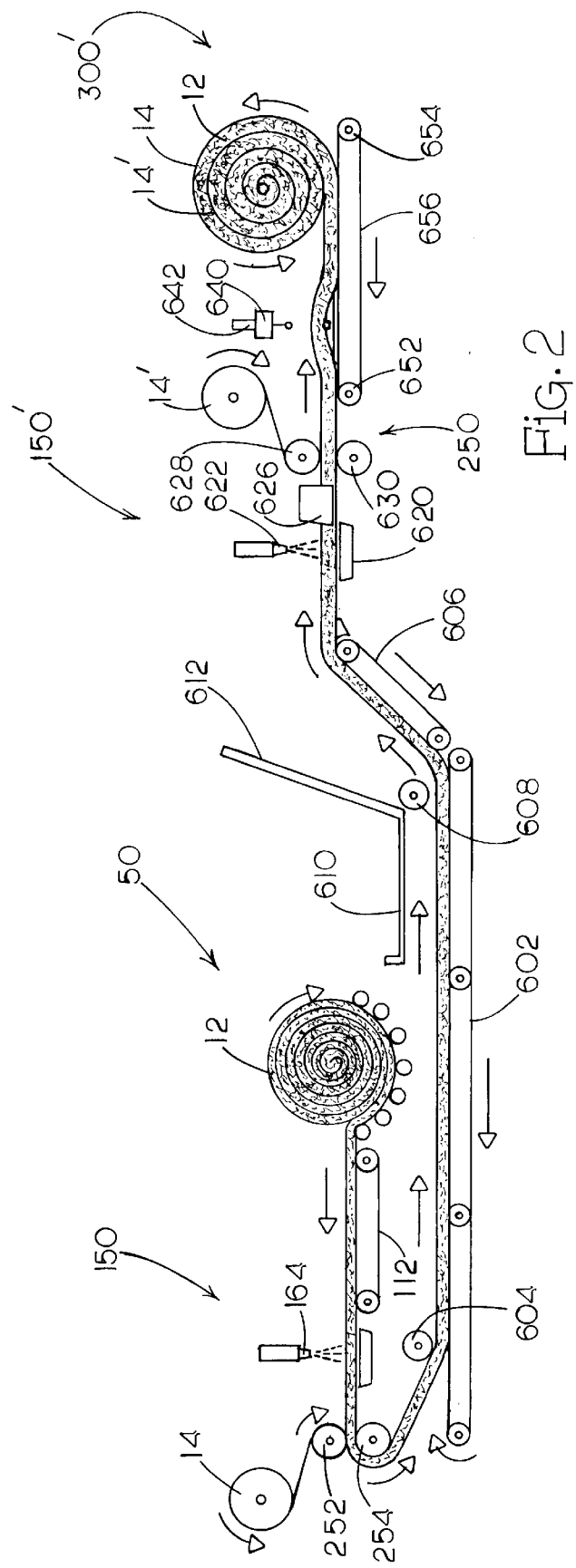
FIG. 2 is a schematic illustrating the method of automatically glue-bonding a layer of scrim to opposite sides of a fiber mat.

Turning to FIG. 2, there is shown therein a method or process for applying scrim to opposite sides of the fiber mat 12. In this case, the fiber mat 12 is advanced through essentially two stages. The first stage entails applying one sheet of scrim 14 to one side of the fiber mat 12 and the second stage entails applying a second sheet of scrim 14' to an opposite side of the fiber mat 12. The first stage of the process illustrated in FIG. 2 is essentially the same process described above and shown in FIG. 1. In particular, as illustrated in FIG. 2, the fiber mat 12 is unwound at the unwinding station 50 and advanced by conveyor belt 112 under the glue application station 150 and then directed along with the scrim sheet 14 into the throat of the compression rollers 252 and 254. This is the first stage of the two-sided process.

Once the fiber mat 12 exists the compression rollers 252 and 254, its direction is generally reversed. As indicated in FIG. 2, the fiber mat 12 is directed under a turn idler 604 onto an elongated conveyor 602. Conveyor 602 conveys the fiber mat 12 with the scrim sheet 14 glued to the underside thereof left to right as viewed in FIG. 2. Thus, it is appreciated that once the fiber mat 12 is turned and its direction reversed the scrim 14 lies on the underside, leaving the upper side of the mat clear and exposed. Conveyor 602 conveys the fiber mat 12 and the one layer of scrim 14 to a ramp conveyor 606. Ramp conveyor 606 positively conveys the fiber mat and the glue-bonded single sheet of scrim 14 upwardly to where the fiber mat is turned and directed under a second glue application station 150'. Here, the upper surface of the fiber mat 12 is sprayed with a glue solution.

After passing through the second glue application station 150', the fiber mat 12 is directed into the throat of a second pair of compression rollers 628 and 630. There, a second sheet of scrim 14' is directed into the same throat area between the compression rollers 628 and 630. Compression rollers 628 and 630 press the second sheet of scrim 14' downwardly onto the upper surface of the fiber mat 12. The fiber mat 12 that exits the second pair of compression rollers 628 and 630 now includes a glue-bonded sheet of scrim on both the top and bottom surfaces. This forms a fiber mat-scrim composite that includes two sheets of scrim 14 and 14' on opposite sides of the fiber mat.

After exiting the compression rollers 628 and 630, the fiber mat-scrim composite is conveyed by conveyor 656 underneath a hot wire cutter 640 that is actuated by pneumatic cylinder 642. At selected intervals, the hot wire cutter 640 is actuated causing the same to move downwardly to cut the fiber mat-scrim composite. As with the process described in FIG. 1, the final fiber mat-scrim composite is, after being cut, wound into a roll and packaged at the winding station 300'.

Now, with reference to FIGS. 3–7, a machine for applying scrim 14 to one side of a fiber mat 12 is shown therein and indicated generally by the numeral 10. Machine 10 includes a mainframe structure 20 that is supported by a plurality of wheels 12.

Figure 3:
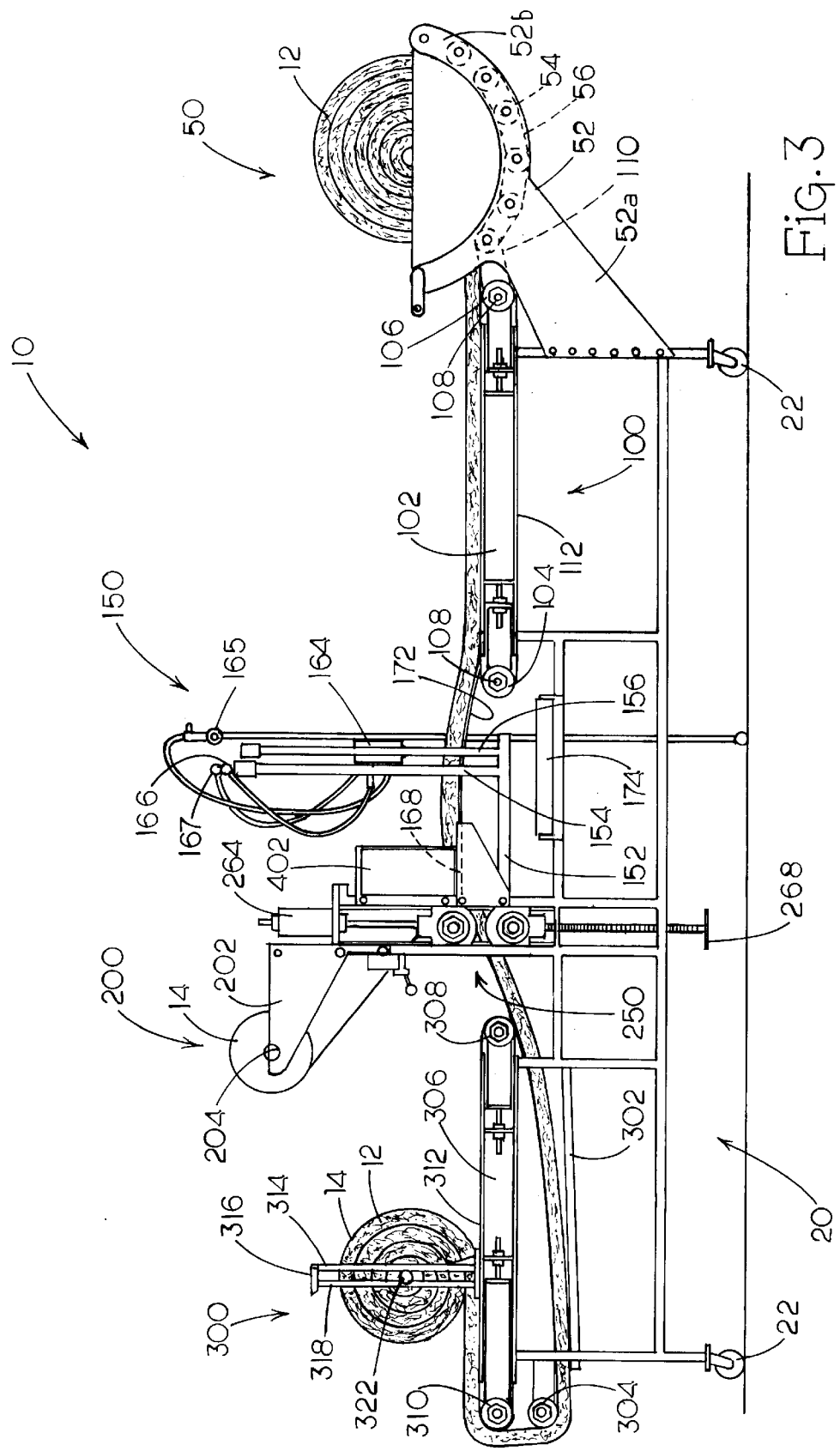
FIG. 3 is a side elevational view of a machine for automatically glue-bonding a sheet of scrim to one side of a fiber mat.

Formed on the right side of the machine 10, as viewed in FIG. 3, is the unwinding station indicated generally by the numeral 50. Unwinding station 50 basically comprises a cradle structure that includes a pair of side panels 52. Side panels 52 are secured to the mainframe 20 and extend therefrom. Each side panel 52 includes a connector section 52*a* and an arc arm 52*b*. Extending between the pair of arc arms 52*b* is a series of drive rollers 54. As particularly illustrated in FIG. 4, each of the drive rollers 54 are driven by a series of drive cords 56 that transfer torque from one roller to an adjacent roller. Extending across front and back areas of the arc arms 52*b* is a pair of support rods 58. Support rods 58 support a pair of adjustable guide panels 60. Guide panels 60 can be adjusted laterally back and forth on support rods 58. In practice, the guide panels 60 are stationed in spaced apart relationship and are designed to accept and receive therebetween a roll of fiber mat 12 (FIG. 3).

Continuing to refer to FIG. 3, disposed downstream from the unwinding station 50 is a feed area indicated generally by the numeral 100. The feed area 100 includes a stationary platform 102 that is secured to the mainframe 20 of the machine 10. Rotatively mounted downstream in the stationary platform 102 is an elongated driven roller 104. Rotatively mounted along the opposite edge or side of the stationary platform 102 is an idler roller 106. Both rollers 104 and 106 are supported by bearing assemblies 108 carried by the stationary platform 102. Trained around rollers 104 and 106 is at least one conveyor belt 112 that runs over a top plate that forms a part of the platform 102. It should be appreciated that in lieu of one single conveyor belt 112, that there may be a series of smaller belts trained around the respective rollers 104 and 106. In order to positively drive the series of rollers 54 journaled between the arc arm 52*b* of the cradle, there is provided a drive cord 110 that operatively interconnects the upstream roller or idler roller 106 with an adjacent roller 54 that is journaled within the cradle structure (FIG. 4).

Disposed downstream from the stationary platform 102 is a glue application station 150. As will be appreciated from subsequent portions of this disclosure, the glue application station 150 comprises a series of glue nozzles 164 (FIG. 5) that dispense a glue solution onto the upper surface of the fiber mat 12 as it is advanced under the glue station.

Figure 4:
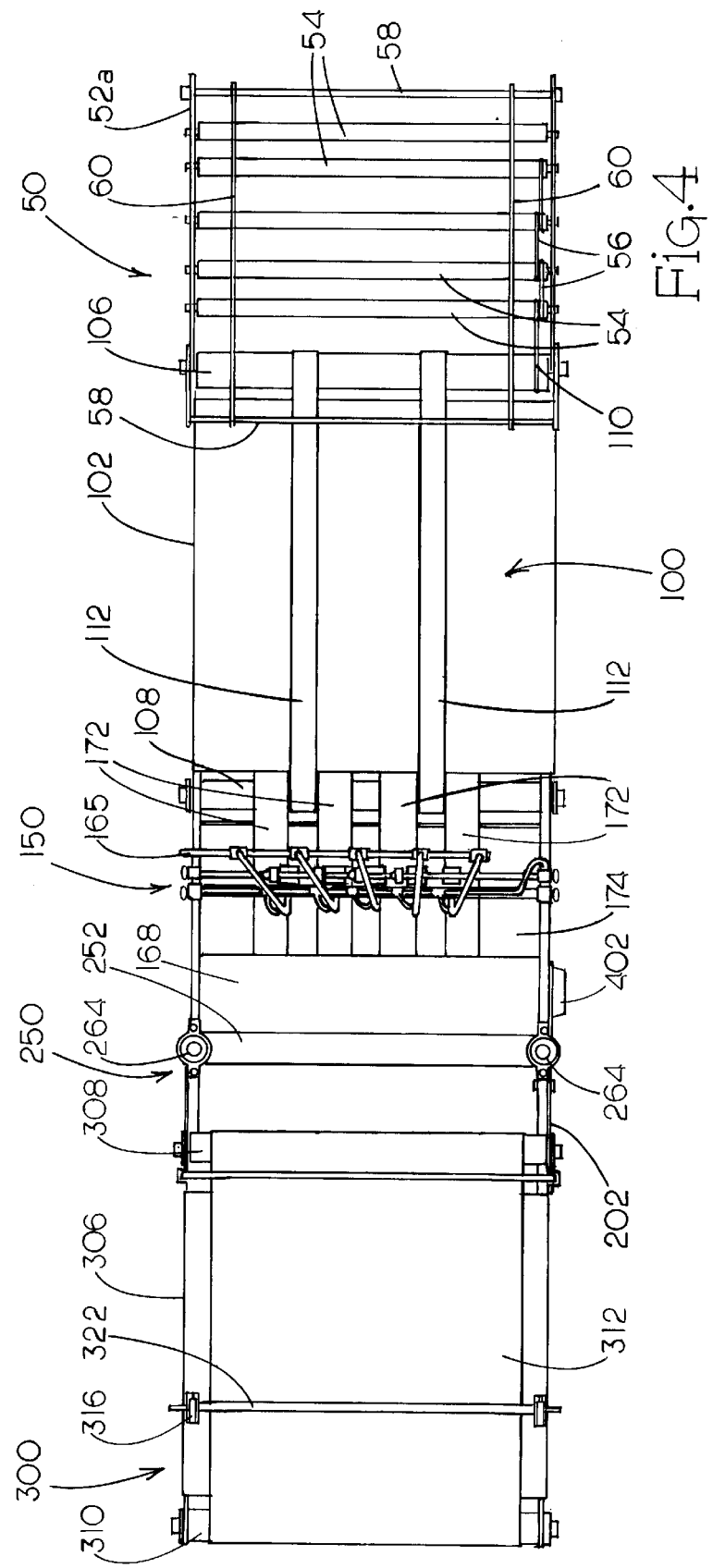
FIG. 4 is a top plan view of the machine shown in FIG. 3.
Figure 5:
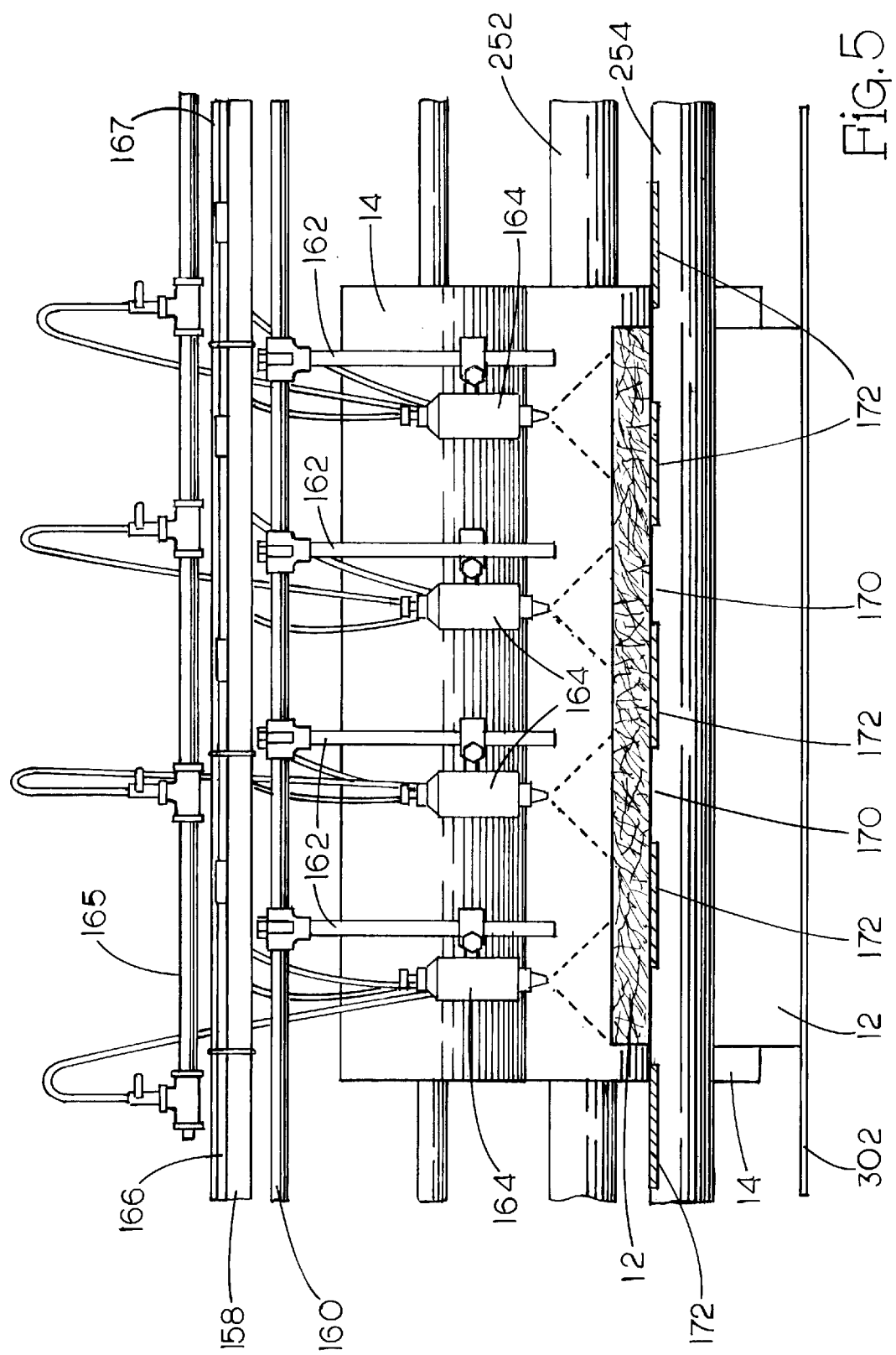
FIG. 5 is a transverse sectional view of the machine shown in FIG. 3 illustrating the various glue nozzles that form a part of the glue application station.

With particular reference to FIGS. 3–5, the structure of the glue station 150 is shown therein. A horizontal member 152 forms a part of the frame structure 20 and supports on each side of the machine 10 a pair of upstanding vertical members 154 and 156. Vertical members 154 and 156 support a pair of transverse members referred to as adjustable crossbars 158 and 160 (FIG. 5). As illustrated in FIG. 5, crossbar 158 supports a pair of air pipes 166 and 167. Cross member 160 includes a series of laterally spaced adjustable down arms 162. Each down arm 162 in turn supports a glue nozzle 164. The structure and function of the nozzles 164 are well-known and appreciated by those skilled in the art. Thus, details of the structure and operation of the glue nozzles 164 are not dealt with herein.

Also extending transversely across the area of the glue station 150 is a a glue manifold pipe 165 that is supported from one side of the machine 10. Thus, as illustrated in FIG. 5, each glue nozzle 164 includes three feeds, a feed from each of the air lines 166 and 167, and a feed from the glue manifold 165. The down arms which support the glue nozzles 164 can be adjusted laterally back and forth and up and down to accommodate various glue spray patterns.

Disposed below the glue nozzles 164 is an open area 170 (FIG. 5). Downstream of the glue station 150 there is provided a transverse support panel 168 that is supported by the frame structure 20. The opening 170 just referred to spans the area between the support panel 168 and the downstream driven roller 104. Spanning the open area 170 is a series of laterally spaced bridge strips 172. The bridge strips 172 are secured to the support panel 168 and project back upstream therefrom. Functionally, the bridge strips 172 act to support the fiber mat 12 as it is advanced through the glue station 150.

Disposed below the glue station 150 and particularly below the glue nozzles 164 is a glue pan 174. The purpose of the glue pan is to catch glue overspray or other glue dispensed by the nozzles 164 that is not intercepted by the fiber mat 12 passing thereover. Finally, there is provided a sensor (not shown) secured about the glue application station 150 that senses the presence of the fiber mat 12 passing thereunder. In the event that the sensor detects the absence of a fiber mat under the glue nozzles 164, then the sensor automatically shuts off and prevents glue from being dispensed by the nozzles 164.

Downstream from the glue station 150 is a scrim source station, indicated generally by the numeral 200. At station 200, there is provided a roll of scrim 14 that is supported by a shaft and a pair of gussets 202 disposed on opposite sides of machine 10. Each gusset 202 includes a shaft holder 204. As seen in the drawings, the shaft is supported by the shaft holders 204 and supports the roll of supply scrim 14. As illustrated in the drawings, gussets 202 are supported by the mainframe 20.

Also located downstream of the glue station 150, is a bonding station indicated generally by the numeral 250. Bonding station 250 comprises a pair of cooperating compression rollers, an upper roller 252 and a lower roller 254 (FIG. 1). Each compression roller 252 and 254 is supported about both ends by an adjustable bearing assembly. That is, the bearing assemblies that support the upper and lower compression rollers 252 and 254 can be moved up and down so as to adjust the space between the rollers.

Figure 6:
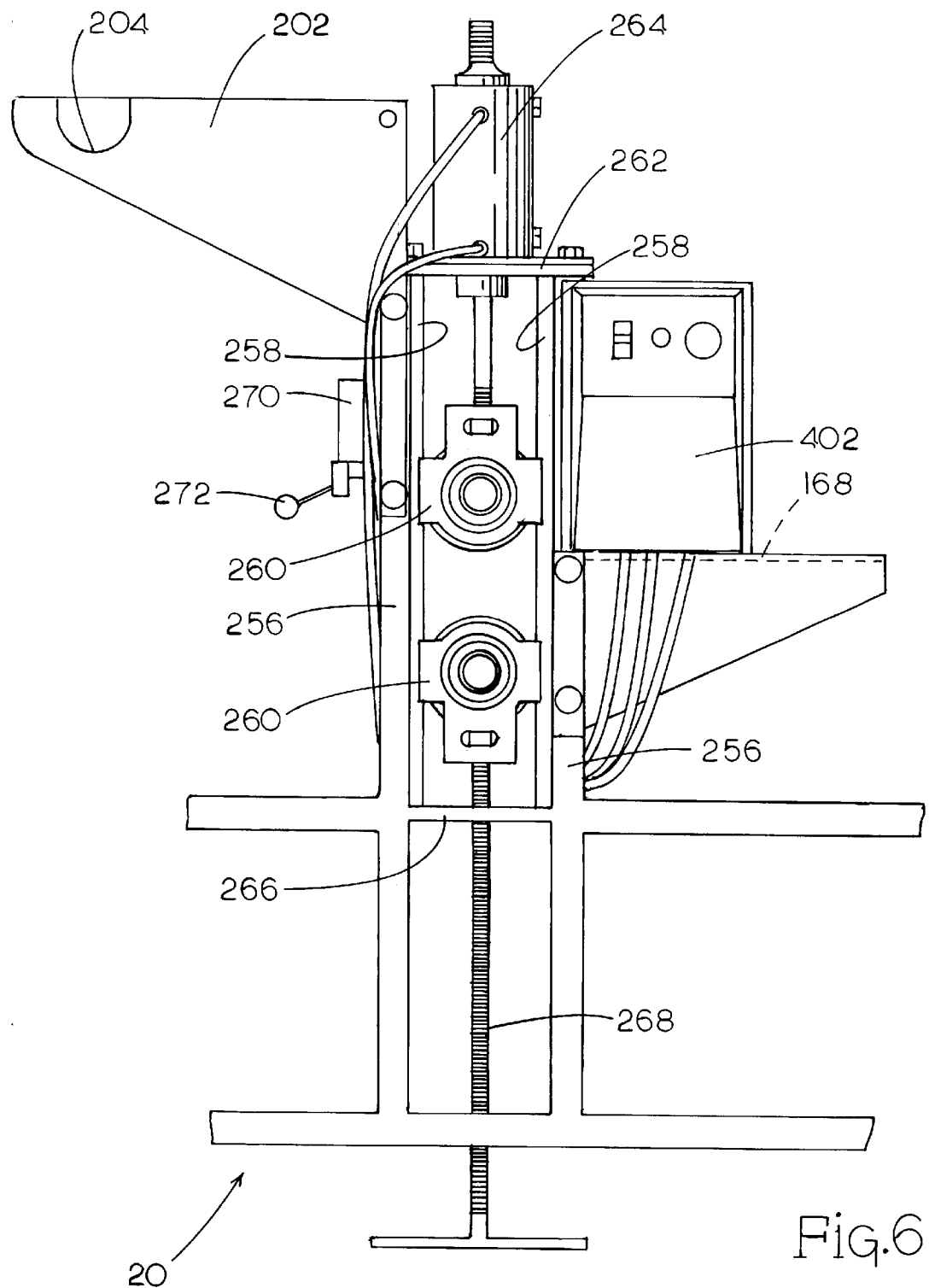
FIG. 6 is a fragmentary side elevational view of an adjustment mechanism used for adjusting the spacing between compression rollers.

For a more detailed view of the structure for supporting the upper and lower rollers 252 and 254, one is referred to FIG. 6. Note that the frame structure 20 includes a pair of upstanding bearing guide bars 256. The bearing guide bars 256 each include an inner guide 258. Each end of each roller 252 and 254 is supported within a bearing assembly 260. About opposite edges of each bearing assembly 260, there is provided a U-shaped notch especially designed to encompass a respective inner guide 258. Thus, each of the bearing assemblies 260 are movable up and down between the inner guides 258.

Connecting the upper portion of the bearing guide bars 256, on each side of the machine, is a cross member 262. Secured to each cross member 262 is a double-acting air cylinder 264. A rod extending from each air cylinder 264 is connected to an upper portion of the upper bearing assembly 260.

Extending below the lower bearing assembly 260 is a cross member 266 that includes a threaded opening therein. A threaded hand crank 268 is threaded through the threaded opening in the cross member 266 and is connected to the lower bearing assembly 260. Thus, it is appreciated that the lower bearing assemblies 260 on each side of the machine 10 can be moved up and down by turning the hand crank 268 and in turn this adjusts the position of the lower roller 254. In like manner, both upper bearing assemblies 260 on both sides of the machine can be adjusted up and down by actuating the air cylinder 264 via an actuating handle 272 that is associated with a control valve 270. It is appreciated that the valve 270 is operative to direct compressed air into either end of the air cylinder.

It is appreciated that both sides of the machine 10 would include an adjustment assembly like that shown in FIG. 5 since both ends of each of the compression rollers 252 and 254 are vertically adjustable. By selectively adjusting the bearing assemblies 260, the spacing between the upper and lower compression rollers can be adjusted. This, of course, allows the operator to vary the compression applied to the fiber mat 12 and scrim 14 as they pass between the rollers.

Downstream from the bonding station 250 is a winding station that is indicated generally by the numeral 300. The function of the winding station 300 is to wind and package the produced fiber mat-scrim composite after it exits the compression rollers 252 and 254.

As seen in FIG. 3, the winding station includes a lower platform 302 that receives the fiber mat-scrim composite that exits the compression rollers 252 and 254. Disposed above the platform 302 is an idler roller 304. Mounted above lower platform 302 and supported by the frame structure 20 of the machine 10, is an upper platform 306. Upper platform 306 forms a conveyor that conveys the fiber mat-scrim composite left to right as viewed in FIG. 3. In particular, a driven roller 308 is journaled transversely along the upstream end of the platform 306. Downstream, there is provided a drive roller 310 that is also rotatively journaled and supported within the upper platform 306. One or more conveyor belts 312 are trained around rollers 308 and 310. As shown in FIGS. 1 and 3, belt 312 is driven such that the upper run moves left to right.

Mounted on the upper platform 306, on each side of the machine, is a reel guide that is designed to take up or roll up the fiber mat-scrim composite that enters onto the downstream end of the upper platform. Each reel guide includes a fixed vertical leg 314 and a pivot leg 318 that is coupled by a rotating latch 316. A shaft space is defined between the fixed leg 314 and the pivot leg 318. A shaft 322 extends between the fixed leg 314 and the pivot leg 318. In the winding operation, an operator starts a terminal end of the fiber mat-scrim composite around the shaft 322. Thereafter, the conveyor belt 312 advances the fiber mat-scrim composite to the winding station 300 and the shaft simply continues to rotate counter clockwise as viewed in FIG. 3 and causes the fiber mat-scrim composite to be wound in a counter clockwise direction, as illustrated in FIG. 3.

After a predetermined quantity of the fiber mat-scrim composite has been wound, the fiber mat-scrim composite is cut and the finished roll removed and packaged and a new winding is started.

Figure 7:
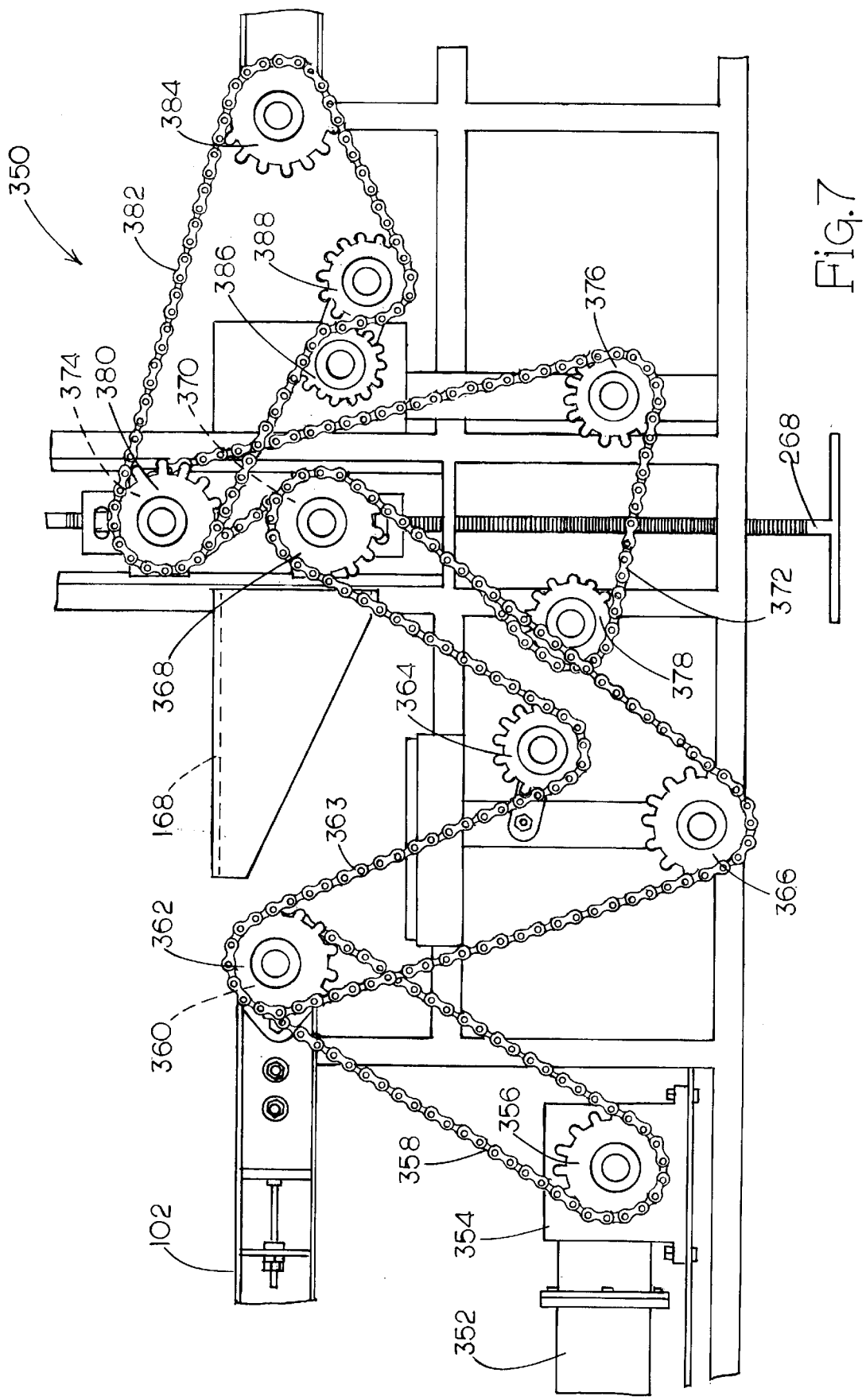
FIG. 7 is a fragmentary side elevational view illustrating the chain drive associated with the machine of FIG. 3.

The drive system for driving the various rollers and conveyors is shown in FIG. 3 and is disposed generally on the side of the machine 10 opposite from that shown in FIG. 3. With particular reference to the drive system, the same is shown in FIG. 7 and indicated generally by the numeral 350. Viewing drive system 350, it is seen that the same includes an electric motor 352 that is connected to a right angle gear box 354 that includes a drive sprocket 356. A first chain 358 is trained around drive sprocket 356 and extends to and is trained around an inner sprocket 360 that is connected to roller 104 that happens to be the downstream roller associated with the platform 102. Thus, chain 358 directly drives roller 104.

Also secured to the shaft associated with roller 104 is an outer sprocket 362 that has a second chain 363 trained therearound. Second chain 363 is trained around a fixed idler sprocket 366 and a tension idler sprocket 364 and is finally trained around an outer sprocket 368 that directly drives the lower roller 254 of the compression rollers.

Secured inside the outer sprocket 368 is an inner sprocket 370. A third chain 372 is driven by the inner sprocket 370. The third chain 372 is trained around an inner sprocket 374 that directly drives upper roller 252. The same third chain 372 is then trained around an adjustable idler sprocket 376 and a fixed idler sprocket 378.

Torque from the upper roller 252 is transferred to an outer sprocket 380 that is in turn operative to drive a fourth chain 382. The fourth chain 382 is trained around sprocket 384 that directly drives the driven roller 308 of the platform 306. The fourth chain 382 is finally trained around a fixed idler 386 and around a tension idler 388. Thus in all, there are four chains that transfer torque from the electric motor 352 to various components of the machine 10.

Briefly touching on the control system for the present invention, the same includes a main control 402 that basically includes an on/off switch and a variable speed control. The variable speed control enables an operator to set the speed of the various conveyors and rollers that form the machine 10 so as to adjust and vary the speed of the product being directed through the machine. In addition, the machine may be provided with a central glue control that would enable the operator to shut the supply of glue off automatically if the need dictated such. As already discussed, it is contemplated that machine 10 of the present invention would include a main control that would be tied to the glue supply that would prevent glue from being dispensed from the glue nozzles 164 in the event that it was determined that no fiber mat 12 was underlying the glue station 150 at any time. This obviously prevents the spraying of glue when in fact there is no fiber mat underneath the glue nozzles 164 to receive the glue.

Figure 8:
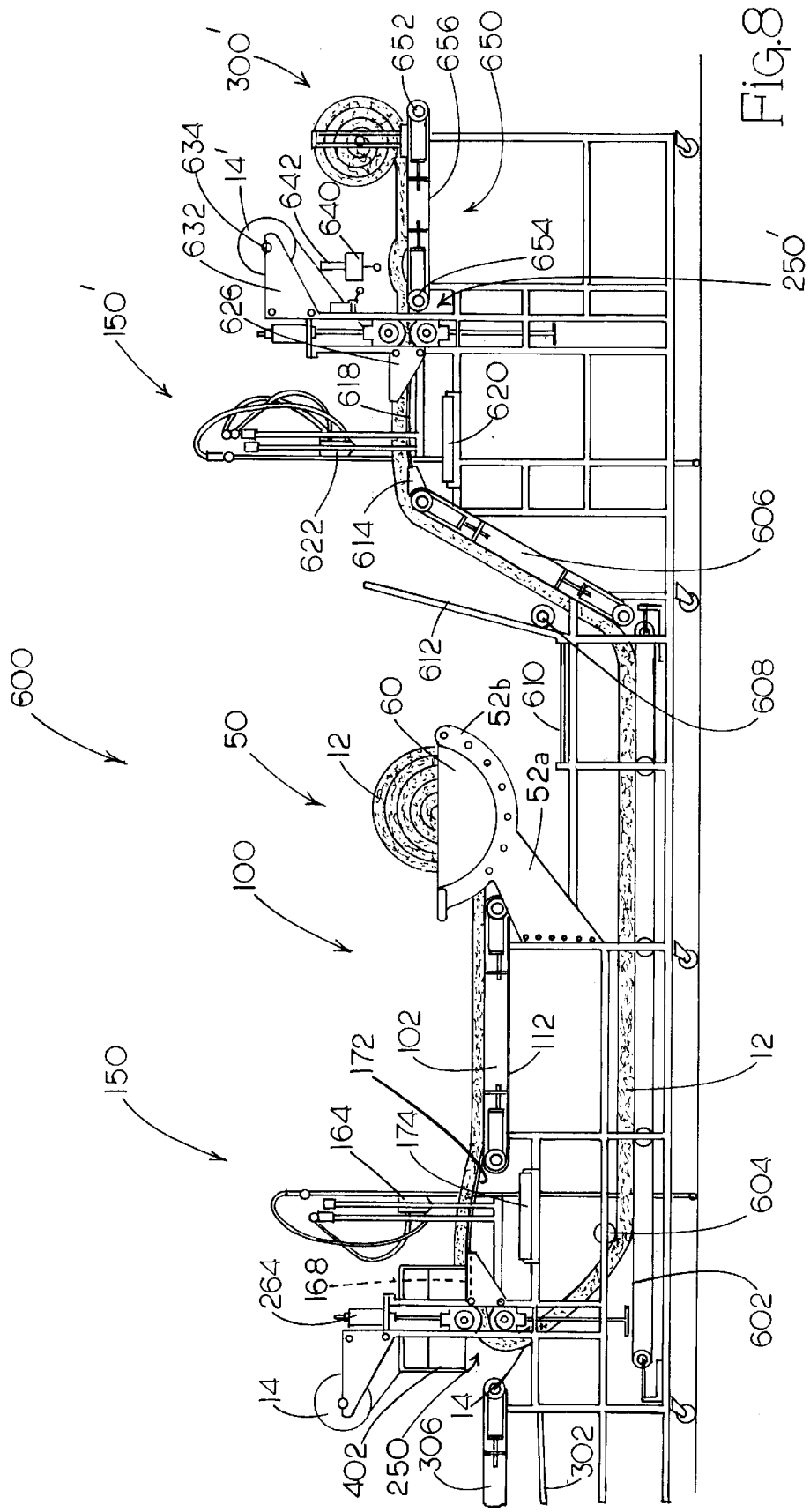
FIG. 8 is a side elevational view of a machine designed to glue-bond two sheets of scrim to opposite sides of a fiber mat.

Now, turning to FIG. 8, there is shown therein a machine for applying scrim to both sides of the fiber mat. This machine is indicated generally by the numeral 600. As will be appreciated, machine 600 is operative to carry out the basic process illustrated in FIG. 2 and described hereinabove.

Machine 600 is to a substantial degree similar to the machine 10 just described and shown in FIGS. 3–7. In particular, machine 600 is essentially identical to the machine shown in FIG. 3 from the unwinding station 50 to the bonding station 250.

Viewing FIG. 8, the produced fiber mat-scrim composite exits the first bonding station 250 (the first set of compression rollers) and is turned back underneath the frame structure 20 of the machine. Disposed underneath the machine 600 is an elongated transfer conveyor 602. Conveyor 602 is designed to transfer the fiber mat 12 having a sheet of scrim 14 bonded thereto generally left to right, as viewed in FIG. 8. In particular, conveyor 602 transfers the fiber mat underneath the frame structure to a ramp conveyor 606. Note that the transfer conveyor 602 extends underneath an operator's platform 610 and a handrail structure 612. The operator's platform 610 allows an operator to stand thereon and to load the unwinding station 50 with supply rolls of the fiber mat 12.

Disposed above the transfer conveyor 606 at opposite ends is a turn idler 604 and a second idler 608. Idlers 604 and 608 assist in directing the fiber mat from the first bonding station 250 to the ramp conveyor 606.

Once the fiber mat 12 having the one sheet of scrim 14 bonded thereto reaches the top of the ramp conveyor 606, the fiber mat then turns generally horizontally and moves across a guide surface 614.

Situated downstream from the upper end of the ramp conveyor 606 is a second glue application station 150'. The second glue station 150' is similar in structure and function to the first glue station 150 just discussed. Second glue station 150' includes an open area disposed thereunder and a glue catch pan 620.

A series of bridge plates 618 span the open area underneath second glue station 150'. A pair of laterally spaced vertical guide plates 626 are disposed downstream of the second glue application station 150'. Guide plates 626 guide the fiber mat 12 into a second pair of compression rollers 628 and 630. (See FIG. 2)

Mounted adjacent the second pair of compression rollers 628 and 630 is a pair of gusset plates 632, each having a shaft holder 634 formed therein. A second source of scrim 14' is disposed and supported between the gusset plate 632. Scrim 14' is unwound from the scrim roll and directed back over the top of the upper rollers 628 into the throat of the compression rollers 628 and 630. Since glue has previously been applied to the upper exposed surface of the fiber mat 12, it follows that the compression rollers 628 and 630 bond the second sheet of scrim 14' to the upper surface of the fiber mat 12. Consequently, the fiber mat 12 exiting the second pair of compression rollers 628 and 630 includes an upper scrim sheet 14' and a lower scrim sheet 14 bonded to opposite sides of the fiber mat 12.

Upon exiting the second pair of compression rollers 628 and 630, the fiber mat-scrim composite is directed underneath a hot wire cutter 640 that is actuated by a double-acting air cylinder 642. The hot wire cutter 640 is operative to selectively cut the fiber mat-scrim composite into selected lengths such that the same can be removed in roll form from the machine and packaged. It should be noted that such a hot wire cutter could be employed in the process of FIG. 1 and on the machine of FIGS. 3–7. However, the fiber mat-scrim composite may be cut by a manual cutter such as a pair of scissors.

It is seen from FIG. 8 that downstream from the second pair of compression rollers 628 and 630, there is provided a final conveyor for conveying the fiber mat-scrim composite left to right towards a final or second winding station 300'. The final conveyor is referred to generally by numeral 650 and includes a pair of rollers 652 and 654 and a conveyor belt 656 trained around the opposite rollers.

Like the winding station 300 described in conjunction with FIG. 3, the final winding station 300' includes the same basic reel guide as previously described. The final conveyor 650 causes the fiber mat-scrim composite to be rolled in a counter clockwise fashion about a shaft that moves up and down in the reel guide.

Now, turning to a discussion of the fiber mat 12 and the scrim 14, the fiber mat 12 is comprised of bonded or unbonded non-woven fibers. The fiber mat disclosed herein is a high loft, low to medium density fiber mat. Low to medium density refers to a fiber mat having a density of approximately ¾ ounce to 8 ounces per square foot. Typically, the loft of the fiber mat will be approximately 1½ inches to 4 inches thick and the density will be approximately 1½ ounces to 4 ounces per square foot.

In a preferred embodiment, the scrim 14 is glue-bonded to a bonded non-woven fiber mat. Those individuals skilled in the art will appreciate the distinction between a bonded and unbonded non-woven fiber mat. Briefly, in the case of a bonded fiber mat, both low-melt fibers and matrix fibers are used. The low-melt fibers melt under the influence of heat and/or pressure and effectively result in a bonding action that bonds the matrix fibers together. This yields a bonded non-woven fiber mat that exhibits relatively good tensile strength compared, for example, to unbonded fiber mats. Unbonded non-woven fiber mats on the other hand, are typically manufactured by a conventional garnetting and cross-lapping process.

As used herein, scrim broadly refers to a thin pliable backing or covering that is capable of being glue-bonded to a fiber mat. In the way of an example, the scrim 14 or 14' disclosed herein is made up of a non-woven polypropylene material or a spun bonded polypropylene material. Typically, the scrim will have a weight of approximately 0.3 ounces to 2 ounces per square yard.

From the foregoing discussion and specification, it is seen that the present invention entails an automatic process for glue-bonding scrim to a continuous fiber mat. The fiber mat is positively fed throughout the process and by positively feeding the fiber mat and the formed composite of the fiber mat and scrim, the process minimizes wrinkles in the composite product and reduces drafting. In the end, the final product includes a smooth coat of scrim glue-bonded to one or both sides of the fiber mat 12. As illustrated herein, the present invention entails a process for applying scrim to either one side of the fiber mat or to both sides.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A method of automatically glue-bonding scrim to a pre-formed fiber mat roll comprising:

a) placing a pre-formed fiber mat roll on a driven unwinding station;

b) engaging a lower portion of the fiber mat roll with a driving mechanism and rolling the fiber mat roll and causing the fiber mat roll to be unwound in response to the fiber mat roll being turned by the driving mechanism;

c) conveying the unwound portion of the fiber mat roll towards a pair of compression elements while any remaining portion of the fiber mat roll is still being rolled and unwound by the driving mechanism;

d) directing a sheet of scrim towards the pair of compression elements;

e) applying glue to either the fiber mat or the scrim;

f) moving both the fiber mat and the scrim to and through the compression element and pressing the fiber mat against the scrim and glue-bonding the scrim to the fiber mat to form a fiber mat-scrim composite;

g) moving the formed fiber mat-scrim composite from the compression elements and i) wherein the unwinding station comprises a cradle having a series of spaced-apart driven rollers and wherein the rollers engage a portion of the fiber mat roll and effectively turn the fiber mat roll and unwind the same as the fiber mat roll is turned.

2. The method of claim 1 including the step of lapping one segment of the fiber mat-scrim composite over another segment of the fiber mat-scrim composite after the fiber mat-scrim composite has exited the compression rollers.

3. The method of claim 1 including the step of winding the fiber mat-scrim composite into a roll after the composite has exited the compression elements.

4. The method of claim 1 including the step of applying the glue to one side of the fiber mat.

5. The method of claim 4 including the step of pulling the scrim into the throat of the compression elements.

6. The method of claim 5 wherein the scrim is pulled from a roll of scrim material.

7. The method of claim 1 including the step of glue-bonding scrim to opposite sides of the fiber mat to form a composite wherein the fiber mat includes scrim on opposite sides thereof.

8. The method of claim 7 wherein there is provided two separate glue application stations and two separate pairs of compression elements for applying two separate sheets of scrim to the fiber mat.

9. The method of claim 7 wherein the scrim is applied from two separate sources and wherein a first layer of scrim is applied to one side of the fiber mat and thereafter the composite fiber mat and scrim is turned and directed in a direction generally opposite to the direction assumed by the fiber mat prior to being bonded to the first scrim source.

10. The method of claim 1 including conveying the fiber mat toward the compression elements and after the scrim has been bonded to the fiber mat then conveying the fiber mat-scrim composite to a take-up station.

11. The method of claim 10 wherein two separate conveyors are employed, one conveyor conveying the fiber mat to the compression elements and a second conveyor that conveys the fiber mat-scrim composite from the compression elements.

12. The method of claim 11 wherein there is provided an open space between the two conveyors, the open space being disposed upstream from the compression elements.

13. The method of claim 12 wherein at least one glue nozzle is disposed over the open space between the two conveyors.

14. The method of claim 13 wherein there is provided a glue catch pan below the glue nozzle.

15. The method of claim 3 including the step of winding the fiber mat-scrim composite such that the bonded sheet of scrim lies exteriorly of the attached fiber mat.

16. The method of claim 1 wherein the step of moving the fiber mat-scrim composite from the compression elements includes conveying the fiber mat-scrim composite downstream relative to the compression elements and then generally reversing the direction of the composite.

17. The method of claim 16 including glue-bonding the scrim to the top of the fiber mat and after reversing the fiber mat-scrim composite then forming the fiber mat-scrim composite into a roll such that the scrim lies outside the fiber mat that forms the composite with the scrim.

18. The method of claim 1 including a conveyor disposed adjacent one side of the unwinding station and wherein unwound portions of the fiber mat leaving the unwinding station are directed onto the conveyor which conveys the unwound portions of the fiber mat towards the compression element while any remaining portion of the fiber mat roll is being driven and turned.

19. The method of claim 1 wherein the driven unwinding station includes a cradle that has associated therewith a driving mechanism for engaging the pre-formed fiber mat roll and turning the same so as to rotate the roll and unwind the same so as to produce an unwound fiber mat segment that is directed onto an adjacently disposed conveyor that conveys unwound portions of the fiber mat from the cradle to the compression elements while the driving mechanism associated with the cradle turns and unwinds the preformed fiber mat roll.

20. The method of claim 7 wherein the fiber mat is positively moved in a first direction prior to a first sheet of scrim being applied thereto, and wherein after the first sheet of scrim has been applied to the fiber mat, then the direction of the fiber mat-scrim composite is generally reversed relative to the first direction of the fiber mat.

21. The method of claim 20 wherein after the first sheet of scrim has been applied to the fiber mat, the fiber mat-scrim composite is transferred underneath a supporting frame structure and conveyed in a direction generally opposite to the first direction of the fiber mat.

22. The method of claim 21 wherein the fiber mat is introduced at an initial feeding station, and wherein after one coat of scrim has been glue-bonded to the fiber mat, the fiber mat and bonded single coat of scrim is conveyed back past the initial feeding station and after passing the initial feeding station a second coat of scrim is applied to the opposite side of the fiber mat.

23. A method of automatically glue-bonding scrim to a non-woven pre-formed fiber mat roll comprising:
    (a) placing the non-woven pre-formed fiber mat roll on a driven cradle having a series of driven rollers;
    (b) positively unwinding the pre-formed fiber mat roll by driving the rollers of the cradle and engaging the underside of the preformed fiber mat roll with the driven rollers and rolling the preformed fiber mat roll in the cradle and causing the pre-formed fiber mat roll to unroll;
    (c) directing the unwound pre-formed fiber mat to an area where the fiber mat will merge with the scrim;
    (d) moving the scrim towards the area where it will merge with the fiber mat;
    (e) applying glue to one side of either the fiber mat or the scrim;
    (f) merging the scrim and fiber mat together while both the fiber mat and scrim are moving; and
    (g) pressing the scrim and fiber mat together to glue bond the scrim to one side of the fiber mat so as to form a fiber mat-scrim composite.

24. The method of claim 23 wherein the non-woven fiber mat is bonded.

25. The method of claim 24 wherein the bonded non-woven fiber mat is of a low to medium density.

26. The method of claim 25 wherein the fiber mat is of a high loft and is of a density in the range of ¾ ounce to 8 ounces per square foot.

27. The method of claim 26 wherein the scrim comprises a bonded non-woven polypropylene material.

28. The method of claim 23 wherein the scrim is supplied by a first scrim source and wherein the method further includes directing a second sheet of scrim from a second scrim source and glue-bonding the second sheet of scrim to the opposite side of the fiber mat to form a composite made up of the fiber mat with scrim glue-bonded to opposite sides thereof.

29. The method of claim 28 wherein the sheets of scrim are glue-bonded to the fiber mat in stages and wherein after the first sheet of scrim is glue-bonded to one side of the fiber mat, the direction of the fiber mat is generally reversed and the second sheet of scrim is applied to the fiber mat.

30. The method of claim 23 wherein the non-woven fiber mat is unbonded.

31. The method of claim 23, including the step of glue-bonding scrim to opposite sides of the fiber mat to form a composite wherein the fiber mat includes scrim on opposite sides thereof.

32. The method of claim 31, wherein the scrim is applied from two separate sources and wherein a first layer of scrim is applied to one side of the fiber mat and thereafter the composite fiber mat and scrim is turned and directed in a direction generally opposite to the direction assumed by the fiber mat prior to being bonded to the first scrim source.

33. The method of claim 23, including winding the fiber mat-scrim composite into a roll.

34. The method of claim 33, including winding the fiber mat-scrim composite so that the scrim lies outwardly from the attached fiber mat.

35. The method of claim 23, including the step of conveying the fiber mat-scrim composite away from the area where the fiber mat is glued to the scrim and generally reversing the direction of the composite and conveying the composite back towards the area where the scrim and fiber mat were first merged and winding the composite into a roll after the direction of the composite has been reversed.

36. The method of claim 23 including directing the unwound portion of the fiber mat onto a first horizontal conveyor and conveying the unwound fiber mat to and over a terminal end of the first horizontal conveyor, and thereafter moving the fiber mat underneath a glue station that Is disposed between the terminal end of the first horizontal conveyor and a pair of compression elements where the fiber mat is unsupported by a moving conveyor as the fiber mat moves between the terminal end of the first horizontal conveyor and the pair of compression elements and wherein glue is sprayed downwardly from the glue station onto the moving fiber mat and wherein the scrim is pulled into the compression element downstream of the glue station; directing the fiber mat scrim composite from the compression elements underneath a second horizontal conveyor and turning the fiber mat-scrim composite approximately 180° and directing the fiber mat scrim composite onto an external end of the second horizontal conveyor such that the fiber mat-scrim composite segment extending from the compression elements underneath the second horizontal conveyor is not supported by a moving conveyor between the compression elements and the external end of the second horizontal conveyor; then conveying the fiber mat-scrim composite on the second horizontal conveyor back towards the glue station on the second horizontal conveyor and in a direction generally opposite to the direction of the fiber mat being conveyed on the first horizontal conveyor; and utilizing the second horizontal conveyor to drive and wind the fiber mat-scrim composite into a roll atop the second horizontal conveyor where the roll of a fiber mat-scrim composite is formed between opposite ends of the second horizontal conveyor.

37. The method of claim 36 including forming the fiber mat-scrim composite roll on the second horizontal conveyor by rolling the composite on a shaft that moves upwardly in a generally vertical direction as the composite roll Increases in diameter and wherein the shaft is laterally confined as the composite roll is formed.

38. The method of claim 37 when the composite fiber mat-scrim roll is rotated on the second horizontal conveyor in a direction opposite to the direction that the pre-formed fiber mat roll is turned and unrolled on the cradle.

39. The method of claim 38 wherein the entire process of converting the pre-formed fiber mat roll to a fiber mat-scrim composite roll is carried out by the cradle and the two spaced apart horizontal conveyors with the glue station and the compression elements being disposed in the space between the opposed two horizontal conveyors.

40. The method of claim 23 including directing the unwound fiber mat portion from the cradle onto a first horizontal conveyor and conveying the fiber mat from the cradle over the first horizontal cradle to a first glue station and spraying glue downwardly onto the fiber mat passing thereon and thereafter conveying the fiber mat roll through a first pair of compression elements and merging a first sheet of scrim onto one side of the fiber mat to form a fiber mat-scrim composite and then turning the fiber mat-scrim composite approximately 180° and conveying the same underneath the cradle and the first horizontal conveyor onto a second horizontal conveyor that leads to a second glue station disposed on the side of the cradle opposite the first glue station and spraying glue on the fiber mat-scrim composite on the side opposite the side having the scrim bound thereto and transferring the fiber mat-scrim composite from the second glue station through a second pair of compression elements and merging a second sheet of scrim with the fiber mat-scrim composite such that the second sheet of scrim is compressed and glued onto the side of the fiber mat composite opposite to the first sheet of scrim, and thereafter conveying the fiber mat-scrim composite having the two sheets of scrim secured thereto onto a third horizontal conveyor and utilizing the third horizontal conveyor to drive and wind the fiber mat-scrim composite into a roll.

41. The method of claim 40 wherein the preformed fiber mat roll disposed in the cradle is turned in a direction opposite to the direction that the fiber mat-scrim composite roll is turned on the third conveyor.

* * * * *